(12) United States Patent  
Davies

(10) Patent No.: US 9,065,567 B2  
(45) Date of Patent: Jun. 23, 2015

(54) COMMUNICATIONS SYSTEM, APPARATUS AND METHOD

(75) Inventor: Euros Davies, Hemel Hempstead (GB)

(73) Assignee: Airwave Solutions Limited, Slough, Berkshire (GB)

( * ) Notice: Subject to any disclaimer, the term of this patent is extended or adjusted under 35 U.S.C. 154(b) by 306 days.

(21) Appl. No.: 13/517,514

(22) Filed: Jun. 13, 2012

(65) Prior Publication Data

US 2012/0322365 A1 Dec. 20, 2012

Related U.S. Application Data

(60) Provisional application No. 61/502,825, filed on Jun. 29, 2011.

(30) Foreign Application Priority Data

Jun. 17, 2011 (GB) .................................. 1110292.8

(51) Int. Cl.
| | |
|---|---|
| H04B 3/36 | (2006.01) |
| H04B 10/2575 | (2013.01) |
| H04B 7/155 | (2006.01) |
| H04L 5/08 | (2006.01) |
| H04B 7/12 | (2006.01) |
| H04W 16/26 | (2009.01) |
| H04W 56/00 | (2009.01) |
| H04W 84/08 | (2009.01) |

(52) U.S. Cl.
CPC ...... *H04B 10/25753* (2013.01); *H04B 7/15542* (2013.01); *H04L 5/08* (2013.01); *H04W 16/26* (2013.01); *H04W 56/00* (2013.01); *H04W 84/08* (2013.01); *H04B 7/12* (2013.01)

(58) Field of Classification Search
USPC ......... 455/7, 8, 11.1, 12.1, 13.1, 25, 517–521
See application file for complete search history.

(56) References Cited

U.S. PATENT DOCUMENTS

| | | | |
|---|---|---|---|
| 5,787,344 A * | 7/1998 | Scheinert | 455/422.1 |
| 2006/0088023 A1 | 4/2006 | Muller | |
| 2010/0022238 A1* | 1/2010 | Kim et al. | 455/427 |
| 2010/0103898 A1* | 4/2010 | Hart et al. | 370/329 |
| 2010/0284446 A1* | 11/2010 | Mu et al. | 375/211 |

FOREIGN PATENT DOCUMENTS

| | | |
|---|---|---|
| EP | 1437910 A2 | 7/2004 |
| EP | 1708420 A1 | 10/2006 |

(Continued)

OTHER PUBLICATIONS

GB Search Report, GB Application No. 1110292.8, Oct. 11, 2011, 1 page.

(Continued)

*Primary Examiner* — Fayyaz Alam
(74) *Attorney, Agent, or Firm* — Fenwick & West LLP

(57) ABSTRACT

Communications apparatus is disclosed which is arranged to configure a signal for transmission on a first carrier frequency from a transmit station, configure said signal for transmission on a second carrier frequency to a remote repeater station for retransmission on said first carrier frequency to form a repeated signal, and delay said signal for transmission on a first carrier frequency from a transmit station.

36 Claims, 7 Drawing Sheets

(56) References Cited

FOREIGN PATENT DOCUMENTS

| | | |
|---|---|---|
| EP | 2375804 A1 | 10/2011 |
| GB | 2476088 A | 6/2011 |
| WO | WO 98/09466 A1 | 3/1998 |
| WO | WO 01/01721 A1 | 1/2001 |
| WO | WO 2004/102859 A2 | 11/2004 |
| WO | WO 2010/088536 A1 | 8/2010 |
| WO | WO 2010/097645 A1 | 9/2010 |

OTHER PUBLICATIONS

GB Search Report, GB Application No. 1120065.6, Jan. 20, 2012, 1 page.

Axell Wireless, "White Paper the new Tetra SDR Repeater," May 2009, pp. 1-4.

GB Search Report, GB Application No. 1119764.7, Feb. 15, 2012, 1 page.

* cited by examiner

COMMUNICATIONS SYSTEM, APPARATUS AND METHOD

CROSS REFERENCE TO RELATED APPLICATIONS

This application claims the benefit of United Kingdom Application No. GB1110292.8, filed Jun. 17, 2011, and U.S. Provisional Application No. 61/502,825, filed Jun. 29, 2011, both of which are incorporated by reference in their entirety. In addition, this application is related to U.S. patent application Ser. No. 13/517,518, titled "Communication System, Apparatus, and Method" with inventor Euros Davies, filed Jun. 13, 2012, and U.S. patent application Ser. No. 13/517,522, titled "Communication System, Apparatus, and Method" with inventor Euros Davies, filed Jun. 13, 2012.

BACKGROUND

1. Field of Art

The present disclosure relates to communications systems, apparatus and methods therefore. In particular, but not exclusively, the present disclosure relates to private mobile radio (PMR) communications systems such as, without limitation, the Terrestrial Trunked Radio (TETRA) system and the P25 or APCO-25 Land Mobile Radio system.

2. Description of the Related Art

PMR communications systems, and TETRA in particular, are suitable for use by emergency services, government agencies, public safety networks and the military where security and reliability of communications is of paramount importance. PMR systems are also used in commercial enterprises, for example, in distributed or wide area locations such as large industrial sites, mine environments and the like.

A PMR system often comprises a single main site over which radio communications signals are transmitted from a Base Transceiver Station (BTS). Such a site may be termed a "cell" or "main site". Mobile transceiver units, termed "Mobile Stations (MS)" in the TETRA standard lexicon, receive and transmit radio communications from and to the BTS when in the site/cell coverage area. In common with many radio communication systems, PMR radio systems such as TETRA can suffer from gaps in coverage due to the terrain, intervening structures such as buildings and within buildings or tunnels for example. To overcome the poor signal conditions repeater stations known as Trunked Mode Operation (TMO) repeaters are used to extend coverage into the affected area to fill gaps in the outdoor coverage or to extend coverage into buildings and tunnels.

However, good isolation between the receive and transmit antennas of the repeater station is necessary otherwise the repeater station signals may go into oscillation within the circuitry, caused by a signal being transmitted from the transmit antenna being received by the receive antenna and the repeater station repeating and transmitting that signal again and then received and repeated again and again until the repeater station fails.

Aspects and embodiments of the present configurations were devised with the foregoing in mind.

SUMMARY

Viewed from a first aspect, there is provided a communications apparatus, arranged to: configure a signal for transmission on a first carrier frequency; configure said signal for transmission on a second carrier frequency to a remote repeater station for retransmission on said first carrier frequency to form a repeated signal; and delay said signal for transmission on a first carrier frequency.

Viewed from a second aspect, there is provided communications apparatus, arranged to: configure a signal for transmission on a first carrier frequency; configure said signal for transmission on a third carrier frequency; and convert said third carrier frequency to a second carrier frequency for transmission to a remote repeater station for retransmission on said third carrier frequency to form a repeated signal.

Viewed from a third aspect there is provided a communications method comprising: configuring a signal for transmission on a first carrier frequency; configuring said signal for transmission on a second carrier frequency to a remote repeater station for retransmission on said first carrier frequency to form a repeated signal; and delaying said signal for transmission on a first carrier frequency.

Viewed from a fourth aspect there is provided a communications method, comprising: configuring a signal for transmission on a first carrier frequency; configuring said signal for transmission on a third carrier frequency; and converting said third carrier frequency to a second carrier frequency for transmission to a remote repeater station for retransmission on said third carrier frequency to form a repeated signal.

Embodiments in accordance with the first and second aspects reduce the likelihood of intersymbol interference occurring at a mobile station in a communications system utilizing frequency shifting repeater/enhancer units. Additionally, higher power communications are possible than hitherto resulting in highly robust and reliable systems. Moreover, higher power systems utilizing repeater/enhancer units obviate the need for full BTS equipment implementation to achieve wide area coverage thereby saving costs. Thereby making frequency re-use easier to achieve resulting in greater spectrum utilization efficiency. This is particularly important for environments where the available radio communications spectrum is limited.

Typically, the communications apparatus comprises a local repeater station operative to transmit on said second carrier frequency and wherein said communications apparatus is further arranged to couple said signal to said local repeater station for transmission on said second carrier frequency. Repeater stations are readily available communications apparatus making their use straightforward in embodiments of the disclosed configurations.

Suitably, the communications apparatus is arranged to couple said signal to said local repeater at said first carrier frequency since the repeater stations are factory configured to receive radio frequency communications. Optionally, intermediate radio frequency signals or even baseband signals may be provided to a suitably configured input of the local repeater station.

In a particular embodiment, the local repeater station comprises two configuration paths, a first configuration path for said signal for transmission on said first carrier frequency and a second configuration path for configuring said signal on to said second carrier frequency thereby enhancing the separation of the first and second carrier frequencies to reduce the likelihood of cross-channel and intermodulation interference. The first configuration path is configurable to introduce said delay into said signal for initial transmission on said first carrier frequency.

Generally the communications apparatus comprises a first module formed as a BTS arranged to configure said signal for transmission on a first carrier frequency; and a second module comprising local repeater station as such modules are commercially available and fit standard equipment racks making them simple to arrange.

A user interface for configuring said delay in said signal for initial transmission is provided in each communications apparatus and advantageously is configured to provide remote access for configuring said delay thereby reducing the need for engineers or technicians to attend geographically remote sites.

Viewed from a fifth aspect, there is provided a repeater station operative as a local repeater station for communications apparatus according to the first aspect referred to above and configured to receive said signal on said first carrier frequency from said communications apparatus and retransmit said signal on said second carrier frequency. Optionally, the local repeater station is operative for communications apparatus according to the second aspect referred to above and configured to receive said signal on a third carrier frequency from said communications apparatus and retransmit said signal on said second carrier frequency.

Viewed from a sixth aspect there is provided a method of operating a repeater station as a local repeater station for a communications method according to the third aspect referred to above comprising receiving said signal on said first carrier frequency from said communications apparatus and retransmitting said signal on said second carrier frequency.

The repeater station may comprise first and second configuration paths, said first configuration path for configuring said signal for transmission on said first carrier frequency and said second configuration path for configuring signals on to said second carrier frequency. Such configuration may include down conversion and demodulation to an IF or baseband frequency and corresponding modulation and up conversion to the second carrier frequency or may be carried out at RF frequencies.

Suitably, the first configuration path is configurable to delay said signal for transmission on said first carrier frequency and the repeater station comprises a user interface operative to configure said repeater station to introduce said delay through said first configuration path.

Advantageously, the user interface is configured to provide remote access to said repeater station for configuring said delay.

Viewed from a seventh aspect, there is provided a remote repeater station comprising a communications receiver configured to receive a signal transmitted on a second carrier frequency; and a communications transmitter configured to transmit on a first carrier frequency said signal received by said communications receiver on said second carrier frequency to form a repeated signal; said remote repeater station configurable to introduce a delay in said signal for transmission on said first carrier frequency.

Viewed from an eighth aspect, there is provided a repeater station operative as a remote repeater station, comprising: a communications receiver configured to receive a signal transmitted on a second carrier frequency; and a communications transmitter configured to transmit on a third carrier frequency said signal received by said communications receiver on said second carrier frequency to form a repeated signal; said remote repeater station configurable to introduce a delay in said signal for transmission on said third carrier frequency.

Suitably, the remote repeater stations include a user interface operative to configure said delay in said signal to be transmitted on said first or third carrier frequency, advantageously providing remote access to said remote repeater station for configuring said delay.

Viewed from a ninth aspect there is provided a method for operating a remote repeater station, comprising: receiving a signal transmitted on a second carrier frequency; transmitting on a first carrier frequency said signal received by said communications receiver on said second carrier frequency to form a repeated signal; and introducing a delay in said signal for transmission on said first carrier frequency.

Viewed from a tenth aspect there is provided a method for operating a remote repeater station, comprising: receiving a signal transmitted on a second carrier frequency; and transmitting on a third carrier frequency said signal received by said communications receiver on said second carrier frequency to form a repeated signal; and introducing a delay in said signal for transmission on said third carrier frequency.

Viewed from an eleventh aspect, there is provided a communications system, comprising: communications apparatus according to the first aspect referred to above; a local repeater station according to the fifth aspect referred to above; a first remote repeater station such as described above, and wherein the local repeater station is configured to invoke a synchronization delay in said signal for transmission on said first carrier frequency corresponding to the sum of the time taken for a signal on said second carrier frequency to reach said first remote repeater station and the time taken for a signal to transition said first remote repeater station to a transmit antenna thereof.

Introducing a delay corresponding to the time a signal takes to traverse the RF link path has the same effect as if the remote repeater station were located adjacent the local repeater station and thus the signal a mobile station sees from either the remote repeater station or communications apparatus are substantially synchronized.

A particular embodiment comprises a second remote repeater station wherein said second remote repeater station is placed at a shorter distance from said local repeater station than said first remote repeater station, said second remote repeater station configured to invoke a synchronization delay in said signal for transmission on said first carrier frequency corresponding to the difference between the time taken for a signal on said second carrier frequency to reach said first remote repeater station from said local repeater station and the time taken for a signal on said second carrier frequency to reach said second remote repeater station from said local repeater station.

The first remote repeater station is chosen to be the remote repeater station furthest from the local repeater station and communications apparatus. The delay introduced at the second remote repeater station has the same effect as if the remote repeater station were located adjacent the local repeater station and thus the signal a mobile station sees from either the second remote repeater station or communications apparatus are substantially synchronized.

Viewed from a twelfth aspect there is provided a communications system, comprising: communications apparatus according to the first aspect referred to above; a first remote repeater according to the eighth aspect referred to above, configured to receive a signal transmitted on said second carrier frequency and retransmit said signal on said third carrier frequency; a second remote repeater station according to the eighth aspect referred to above, configured to receive a signal transmitted on said second carrier frequency and retransmit said signal on said third carrier frequency; and wherein said first remote repeater is disposed a greater distance from said communications apparatus than said second remote repeater; said second remote repeater configured to introduce a synchronization delay in said signal for transmission on said first carrier frequency corresponding to the difference between the time taken for a signal on said second carrier frequency to reach said first remote repeater station from said local repeater station and the time taken for a signal on said second carrier frequency to reach said second remote repeater station from said local repeater station.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
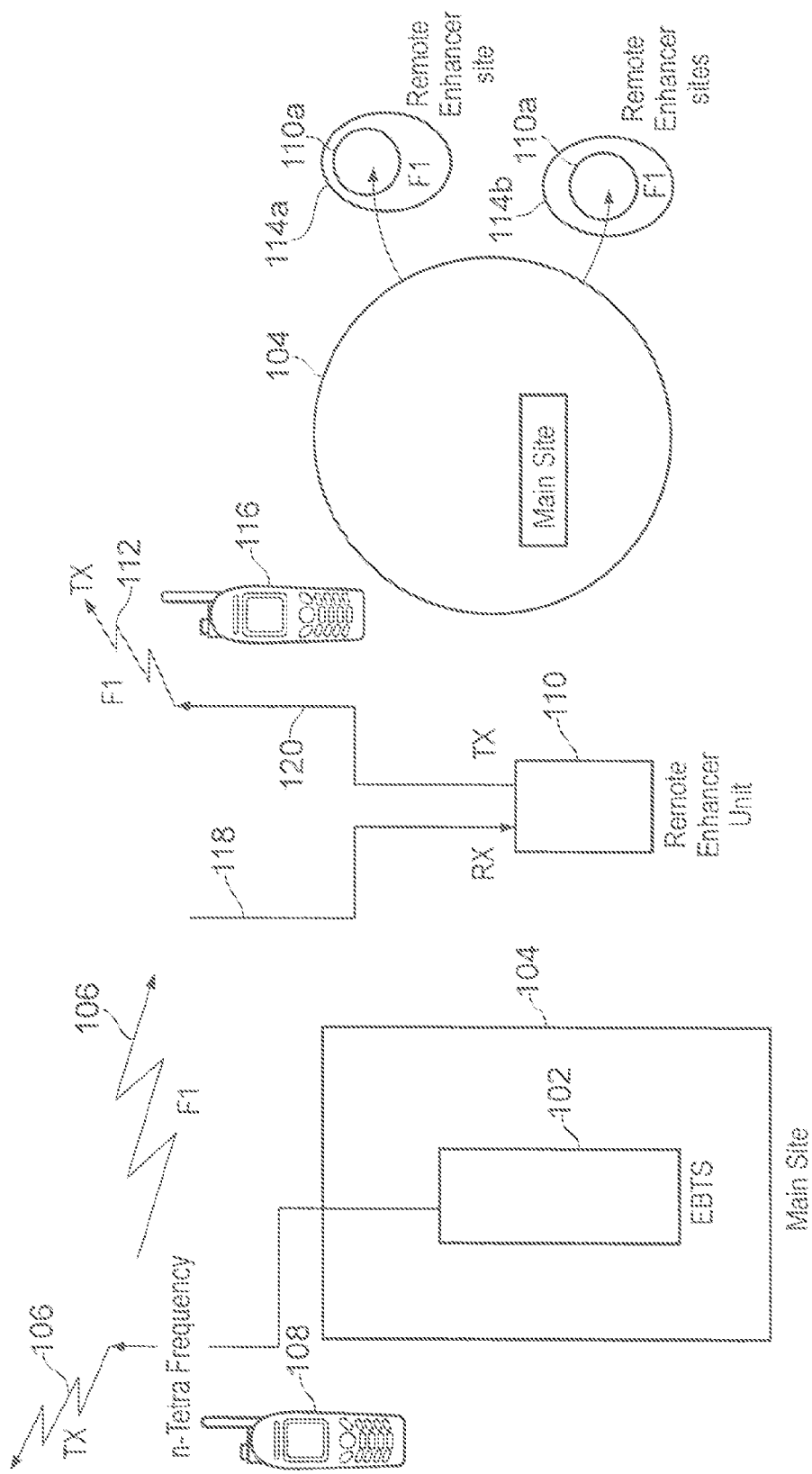
FIG. 1 is a schematic illustration of a conventional TETRA enhanced coverage arrangement utilizing repeater stations.

Conventionally, main site coverage in TETRA systems has been enhanced by the use of TMO mode repeater stations sometimes called standard enhancers. An example of an implementation using such standard enhancers is illustrated in FIG. 1. An enhanced base transceiver station (EBTS), i.e., one that works with an enhancer unit/repeater station, 102 serves a main site 104. The EBTS 102 transmits on a TETRA frequency F1, 106, which is received by TETRA mobile stations 108. A remote enhancer station 110 receives the TETRA signal at frequency F1 and retransmits it at the same frequency, F1, 112, over enhanced coverage area 114 to a TETRA mobile station 116.

Each remote enhancer unit 110a/b retransmits the received TETRA signal at a power sufficient to provide coverage in its local region and thereby "fix holes" in the main site coverage area. However, since the remote enhancer units 110 retransmit on the same frequency each remote enhancer unit 110a/b requires directional antennas to direct the retransmitted signal away from the main site or other relatively close remote enhancer units to avoid interference between the signals. Consequently, the remote enhancer units 110 locate their directional antennas to a side of the enhanced coverage area 116. Furthermore, the receive antenna 118 and the transmit antenna 120 must be separated by a minimum distance to achieve the necessary isolation between them. Typically, a vertical separation of at least 15 meters is required and horizontal separation is best provided by a baffle to block electromagnetic radiation between the two antennas, for example as might conveniently be provided by a plant room or water storage building.

Such restrictions on the implementation of standard enhancers limits their use and makes their implementation sub-optimal from both a technical and cost perspective.

Another example of a TMO repeater configuration for extending the coverage of a TETRA site has been disclosed in a White Paper entitled "THE NEW TETRA SDR REPEATER" internet published by Axell Wireless, May 2009. Although the White Paper refers to software defined radio (SDR), embodiments of the present configuration are not limited to such radios. The Axell White Paper describes the use of a frequency shifting repeater, also known as a frequency translation enhancer, to extend the coverage of a TETRA main site. The TMO repeater arrangement is illustrated in FIG. 2 of the drawings.

Figure 2:
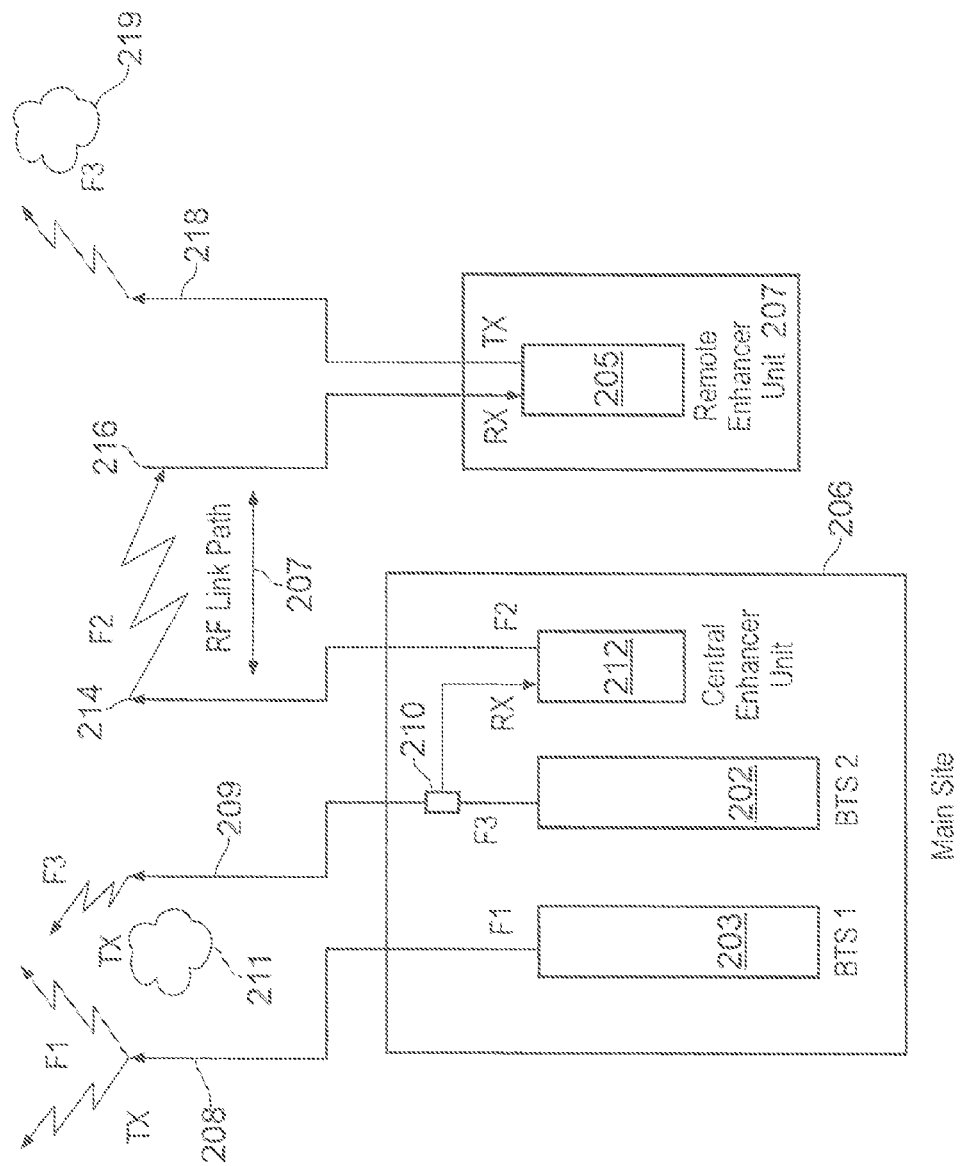
FIG. 2 is a schematic illustration of a known frequency shifting repeater arrangement utilizing sectored antennas for extending coverage of a TETRA site.

In general outline, the repeater arrangement illustrated in FIG. 2 utilizes a radio frequency link path 201 to radiate a signal generated at BTS 202 from antenna 214 to antenna 216 of remote repeater 205. The radio frequency link path is at a different frequency from the frequency used to broadcast over the main site 206 in order to avoid interference between the signals. The signal communicated over the link path is received at remote repeater 205 and reradiated at another frequency different from the link path frequency and the frequency used to broadcast over the main site in the direction of the remote repeater antenna 218. The antenna 218 used to reradiate the signal received over the link path 201 is directed to radiate in a direction to provide enhanced coverage 219 and away from the BTS antenna 208, again to avoid interference.

A BTS 203 provides downlink radio signals to antenna 208 which radiate those signals over the main site 206. Downlink signals from the BTS 202 are transmitted at a carrier frequency F3 using sectored antenna 209 in an extended coverage area 211. The BTS 202 downlink F3 carrier signal is also directed through a power coupler 210 to the receiver port of a donor or central enhancer unit/repeater station 212. The F3 carrier signals undergo signal processing, including filtering to block any unwanted frequencies, to convert the carrier signals to link frequencies F2 for transmission from link antenna 214 over the RF link path 201.

Signals transmitted from link antenna 214 at link frequency F2 form the radio-frequency link path 201 to receive antenna 216 for remote repeater 205. The F2 signals are input to a receiver port of remote repeater 205 and converted for retransmission at carrier frequency F3 from sectored antenna 218 arranged to radiate in a direction away from the radiation direction of sectored antenna 209 to avoid interference with the signals transmitted from that antenna.

For the avoidance of doubt, F1, F2 and F3 refer to groups of communication channels each channel at a different carrier frequency, a group possibly comprising just one channel or multiple channels. The terms "carrier frequencies" and "communication channels" may be used interchangeably in the following.

As can be seen from the foregoing, the known arrangements are relatively complex with multiple different carrier frequency communications channels within the repeater/enhancer system.

Furthermore, ISI may still present a problem in the known arrangements. For example, in the TETRA system if the power difference between identical channel frequencies is less than 19 dB and the delay between signals is greater than the TETRA standard requirement for class A of 14 μs ISI is still a problem if class A mobile station devices are utilized. This means that there may be a limit on where an enhanced region may be located, i.e., it needs to be in a location where the repeater/enhancer station can propagate a signal to a class A mobile station located in a region with sufficiently low ISI with other signals and in practice may mean that an enhanced system is limited to the use of just one enhancer unit, at least so far as external deployment is concerned. This may significantly limit deployment options, for example in rural areas only a single omnidirectional antenna is used and so site sectorisation may not be available.

The known implementations also require sectored antennas, sectored sites and corresponding BTS units and ground-based transmission which increases the cost of the antenna arrangements and site implementation.

Embodiments in accordance with the present configuration ameliorate the issue of ISI by compensating for the time delay between signals from the central Base Transceiver Station (BTS) and a single enhancer and/or multiple enhancers which give rise to ISI. In particular, this may be achieved by synchronizing all enhancers and the BTS to the worst delay seen in the system. Typically, synchronizing multiple remote enhancers is done at remote enhancers by buffering a received signal and delaying the timeslots in the signal by an amount corresponding to the worst delay in the system in order that individual remote enhancers have the same synchronized time delay as the worst time delay in the system. A time delay is introduced into the central BTS for systems where the remote repeater unit or units transmit on the same frequency as the main site. Inter symbol interference is therefore ameliorated since the BTS and the enhancer signals are all matched in time.

Figure 3:
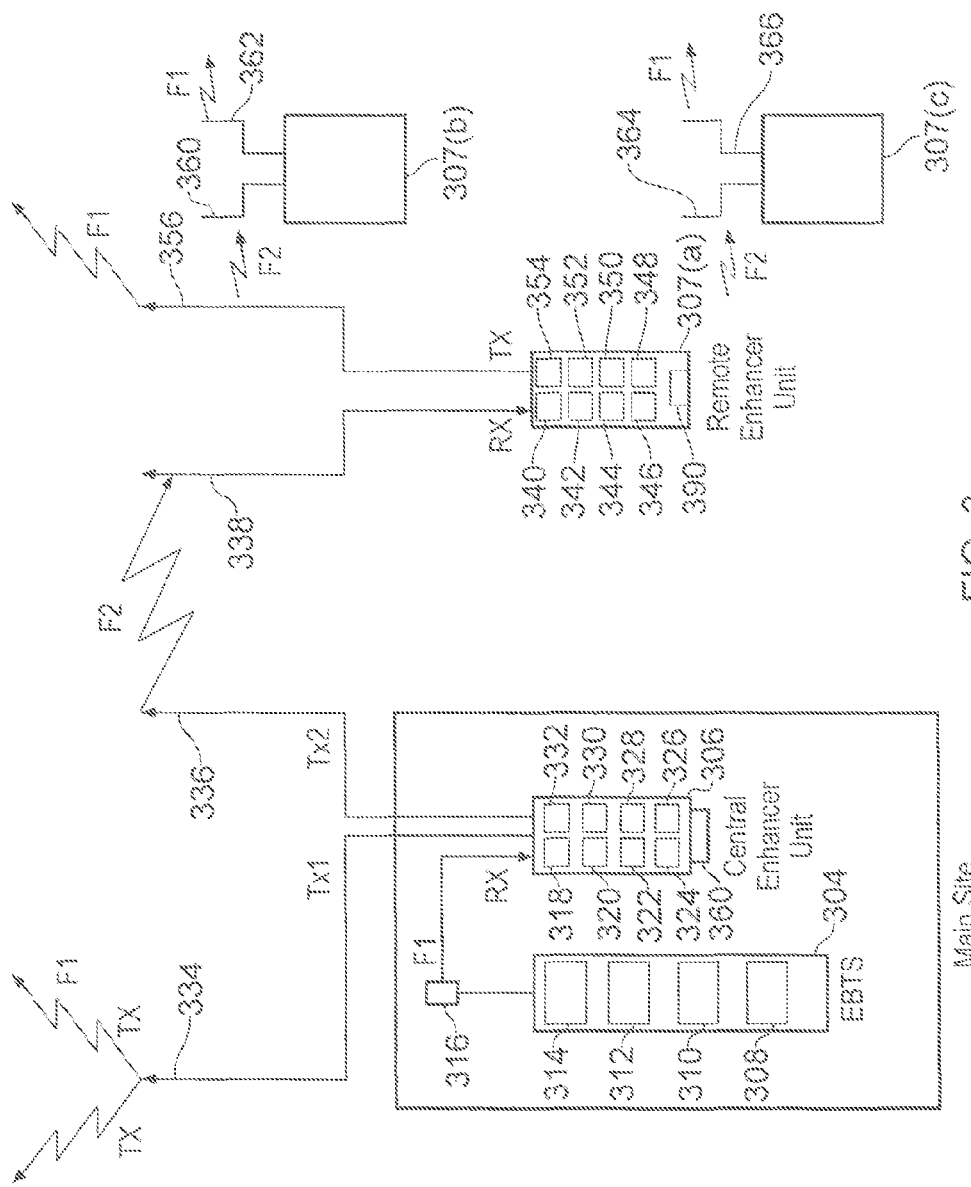
FIG. 3 is a schematic illustration of a first embodiment in accordance with the present disclosure.

FIG. 3 schematically illustrates a first embodiment in accordance with the present configuration in which BTS 304 is utilized and the signal output to a central enhancer unit 306. Remote enhancer units 307 are also provided for creating enhanced coverage area radio propagation.

BTS 304 includes an encoder 308, a modulator 310, a transmission filter 312 and a power amplifier 314. BTS 304 outputs a signal at a carrier frequency F1 that is coupled through coupler 316 to the receiver port of the central enhancer unit 306. The receive path includes a detector module 318, for example a low noise amplifier, a receive filter 320, a demodulator 322 and a decoder 324 for decoding the signal.

The transmit path of central enhancer unit 306 includes an encoder, 326, modulator 328, a transmission filter 330 and a power amplifier 332. In this embodiment the signal is put on to two different communication channel groups, one at carrier frequencies F1 and the other at link carrier frequencies F2 respectively transmitted from the first and second transmission ports. The first transmission port is coupled to antenna 334 from which the communications channels at carrier frequencies F1 is transmitted over the main site. The signals on communication channels at carrier frequencies F2 from the second transmit port are transmitted to antenna 336 for onward propagation over the RF link path to antenna 338 on the remote enhancer units 307.

The signals are modulated onto carrier link frequencies F2 in the central repeater/enhancer in such a way as to prevent TETRA mobile stations from recognizing those signals as TETRA downlinks signals and attempting to access the channels on the link frequencies. Typically, this may be done by so-called inverting TETRA channel management signals on the F2 carriers.

F1 and F2 groups may comprise more than one traffic channel, each with respective carrier frequencies. That is to say, F1 includes all the individual carrier frequencies for forming the traffic channels of BTS 304 and F2 includes all the individual link carrier frequencies for forming the RF path link corresponding to each of the traffic channels of BTS 304.

Although a single transmit path through the central enhancer 306 has been described, embodiments may be implemented utilizing a separate transmit path for each of F1 and F2. Such an arrangement enhances the separation of the F1 and F2 signals thereby avoiding cross-channel interference and/or inter-modulation.

Optionally or additionally, a single antenna may be utilized for transmitting both F1 and F2 signals although care will have to be taken over which carrier signals are employed since deployment may be limited due to the need to reduce the power of each signal in order to enhance isolation between the F1 and F2 signals, i.e., reduce inter-modulation and cross-channel interference for example.

The signal received at antenna 338 is coupled to the receive port of remote enhancer unit 307(*a*) and undergoes signal processing through a detector 340, a receive filter 342, a demodulator 344 and a decoder 346. The decoded signal is forwarded to the transmission path for encoding in encoder 348, modulated on to frequency F1 in modulator 350, forwarded through transmission filter 352 on to power amplifier 354 from which it is coupled to antenna 356 for radiating out over the enhanced coverage area. In this embodiment, the signal transmitted from antenna 334 has undergone the same signal processing path as the RF link signal transmitted from antenna 336. Therefore, the delay compared to the F1 signals transmitted at antenna 334 introduced into the system is that due to signal processing in remote enhancer unit 307(*a*) and the time taken for the signals on the F2 carrier frequencies to travel from antenna 336 to antenna 338.

The applicant has conducted experiments indicating that a typical delay through a single repeater/enhancer is 14 μs, although it may be greater or lesser.

A 14 μs delay between signals is typically the upper boundary of acceptable delay for a TETRA system utilizing Class A mobile stations where the difference in strength between delayed signals is less than 19 dB. Consequently, compensation for the delay caused by the delay in the repeated signal going through an extra repeater/enhancer stage is necessary in order to avoid unacceptable ISI in regions where the difference between the main site signal and repeated signal is less than 19 dB. This is all that is required if there is just one remote repeater/enhancer unit.

Central enhancer unit 306 also includes a controller 360 which is user operable to configure a delay in the transmit path for communications channel F1. Typically this will be by way of a tapped delay line and suitably implemented in the transmission filter 330. In this embodiment, the delay is configured to compensate for the delay experienced by going through one repeater/enhancer unit, i.e., around 14 µs and the time taken for signals at F2 carrier frequencies to travel between local repeater station antenna 334 and remote repeater station antenna 336.

There are many examples of delay mechanisms available to the person of ordinary skill in the art and which will not be described in further detail since the availability and implementation of such mechanisms is well known.

Figure 6:
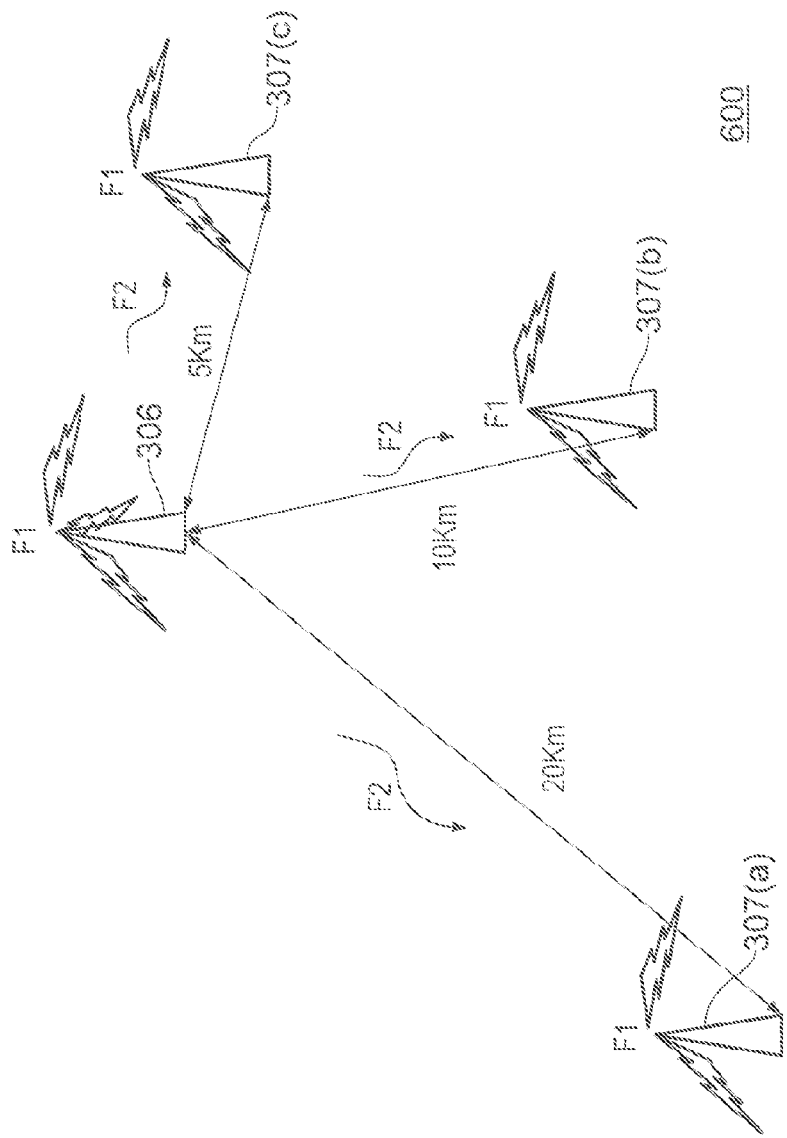
FIG. 6 is a schematic illustration of the difference in separation distance giving rise to different synchronization delay between repeater units in a system in accordance with the embodiment illustrated in FIG. 3.

As illustrated in FIG. 3, it may be desirable for more than one remote enhancer (307(*a*), 307(*b*), 307(*c*)) to be utilized if more than one "coverage enhancement area is desired. For example, an enhancement coverage area may be within enclosed spaces such as courtyards and buildings or in rural areas. Other coverage enhancement areas may be extensions of the main site even so far as to replace the need for further BTS equipment to establish further main sites, thereby providing a cost-effective solution to increasing coverage. However, if more than one remote enhancer unit is used managing the synchronization delay between the signals transmitted from plural remote enhancers and the main site antenna presents a more complex problem than for a system utilizing just one remote enhancer. FIG. 6 illustrates the synchronization delays that occur with plural remote enhancer units 307(*a*), 307(*b*) and 307(*c*) utilizing an embodiment of the invention in accordance with FIG. 3.

A TETRA system 600 having a BTS 304 arranged to couple the F1 carrier frequencies to central enhancer 306 and three remote repeater/enhancer units 307(*a*), 307(*b*) and 307 (*c*) is schematically illustrated in FIG. 6. The three remote units 307(*a*), 307(*b*) and 307(*c*) are located at different distances from the central enhancer 306, namely 20 Km, 10 Km and 5 Km. Consequently, the time taken for the RF link path signal at carrier frequencies F2 to propagate from the central enhancer 308 to each of the remote units 307(*a*), 307(*b*) and 307(*c*) will be different and therefore there will be a different delay between the main site signal at carrier frequencies F1 transmitted by BTS 304 and the repeated signals at carrier frequencies F1 transmitted by each of the remote units 307 (*a*), 307(*b*) and 307(*c*). The difference in delay may be calculated based on the simple time, distance, velocity relationship:

$$t=d/c;$$

where t is time taken, d is the distance and c the velocity of light.

For the example illustrated in FIG. 6 the following propagation times may be derived.
taking the speed of light c to be $3 \times 10^8$ m/s;
d=distance in meters;
t=time in seconds.
Propagation time for remote unit 307(*c*); t=5000/3× $10^8$=16.67 µs;
Propagation time for remote unit 307(*b*); t=10000/3× $10^8$=33.33 µs; and
Propagation time for remote unit 307(*a*); t=20000/3× $10^8$=66.67 µs.

The propagation time is greatest between central enhancer 306 and the antenna 338 for the remote enhancer unit 307(*a*), i.e., 66.67 µs. Therefore, in order to compensate for the RF link path propagation delay a synchronization delay of 66.67 µs is introduced into the signal path for the signal at carrier frequencies F1 generated by central enhancer 306. There is also a difference in synchronization between the signals transmitted from the furthest remote unit 307(*a*) and the other remote units 307(*b*) and 307(*c*). Thus, ISI may occur between the signals transmitted at the other remote units, 307(*b*) and 307(*c*) on carrier frequency F1 and the signal transmitted from antenna 356 of the furthest remote enhancer 307(*a*) on carrier frequency F1 due to the different delay caused by different RF link path distances.

In order to compensate for the difference in signal delay, the repeated signal at remote units 307(*b*) and 307(*c*) is delayed by an additional synchronization delay corresponding to the difference between the propagation to respective remote units and the maximum propagation delay, i.e., between antenna 334 and remote unit antenna 338 of remote unit 307(*a*). Therefore, an additional synchronization delay of 33.34 µs is introduced into the repeated signal path of remote enhancer unit 307(*b*) and an additional synchronization delay of 50 µs is introduced into the repeated signal path of remote enhancer unit 307(*c*). Naturally, if there were less, i.e., two, or more, i.e., greater than three, remote enhancer units the difference in delay would be compensated in each of the units and would be taken into account. The delay in each remote enhancer unit may be controlled by controller 390 for each remote enhancer unit.

Figure 4:
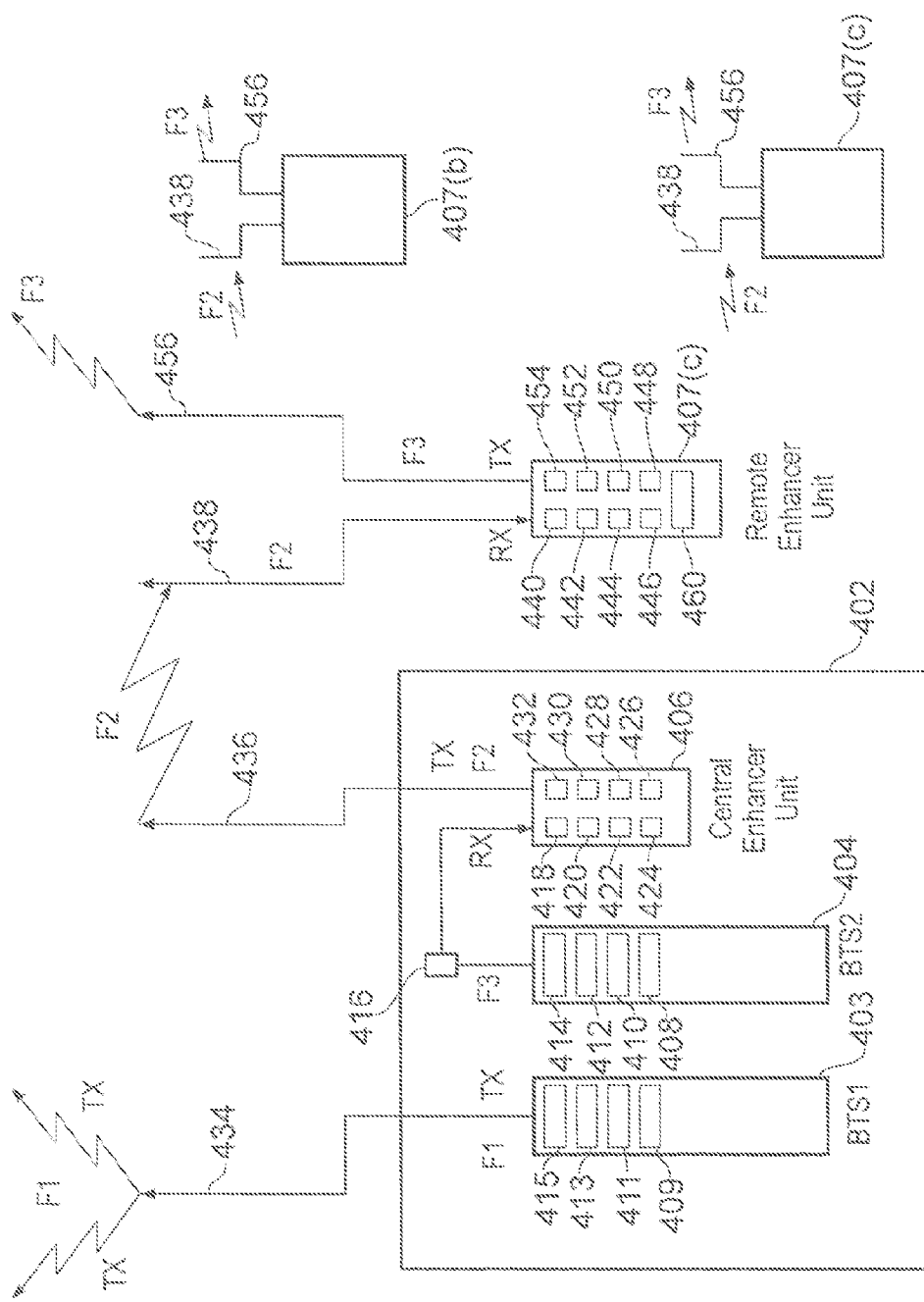
FIG. 4 is a schematic illustration of a second embodiment in accordance with the present disclosure.

Turning now to FIG. 4, a second embodiment in accordance with the present disclosure is illustrated in which a second BTS is utilized to mitigate ISI between a central BTS/enhancer and remote repeater/enhancer units. Two base station transceivers 403 and 404 are provided in a central location together with a central enhancer unit 406. Remote enhancer units 407 are also provided for creating enhanced coverage area radio propagation.

BTS 403 and BTS 404 include similar signal processing modules to those contained within the BTS 304 described with reference to FIG. 3. That is to say, BTS 403/404 include an encoder 408/409, a modulator 410/441, a transmission filter 412/413 and a power amplifier 414/415. BTS 403 modulates signals on to carrier frequencies F1. BTS 404 modulates signals on to carrier frequencies F3 which are coupled through coupler 416 to the receiver port of the central enhancer unit 406. The receive path of central enhancer unit 406 includes a detector module 418, for example low noise amplifier, a receive filter 420, a demodulator 422 and a decoder 424 for decoding the signal. The transmit path of central enhancer unit 406 includes an encoder, 426, modulator 428, a transmission filter 430 and a power amplifier 432.

F1 comprises communication channels at carrier frequencies within group F1 defining a separate coverage area to that covered by the signals on communication channels comprising the carrier frequencies in group F3.

The F1 signal generated by BTS 403 is coupled to antenna 434 from which the F1 carrier channels are transmitted over the main site. The F3 signals are generated by BTS 404 and transmitted as F3 communication channels. The F3 communication channels are coupled directly via coupler 416 to the central enhancer unit 406 where they are converted to link channel frequency F2 and forwarded to antenna 436 for transmission over the RF link path to antenna 438 on each of the remote enhancer units 407(*a*)(*b*)(*c*). As with the embodiment described with reference to FIG. 3, the signals on the F2 carriers is such so as not to be usable by mobile stations, e.g., inverted.

Referring to enhancer unit 407(*a*) as an example for detailed explanation, the F2 link channel signals received at antenna 438 are coupled to the receive port of remote enhancer unit 407(*a*) and undergo signal processing through the detector 440, the receive filter 442, the demodulator 444 and decoder 446 from which they are forwarded to the transmission path for encoding at encoder 448, converted to carrier frequencies for F3 communication channels in modulator 450, through transmission filter 452 on to power amplifier 454 from which it is coupled to antenna 456 for transmitting over the enhanced coverage area. In this embodiment, since the carrier frequencies of the signals transmitted from BTS 403 via antenna 434 are in group F1 and different from F3, the carrier frequencies for the signals transmitted from remote enhancer units 407, ISI does not occur between the signals on F1 and F3 carrier frequencies. However, there is the possibility of ISI between the signals on carrier frequencies F3 transmitted from remote enhancer units 407(a), 407(b) and 407(c) due to the different delays caused by the different distances of the RF link path between the central enhancer 406 and respective remote enhancers 407(a), 407(b) and 407(c).

Figure 7:
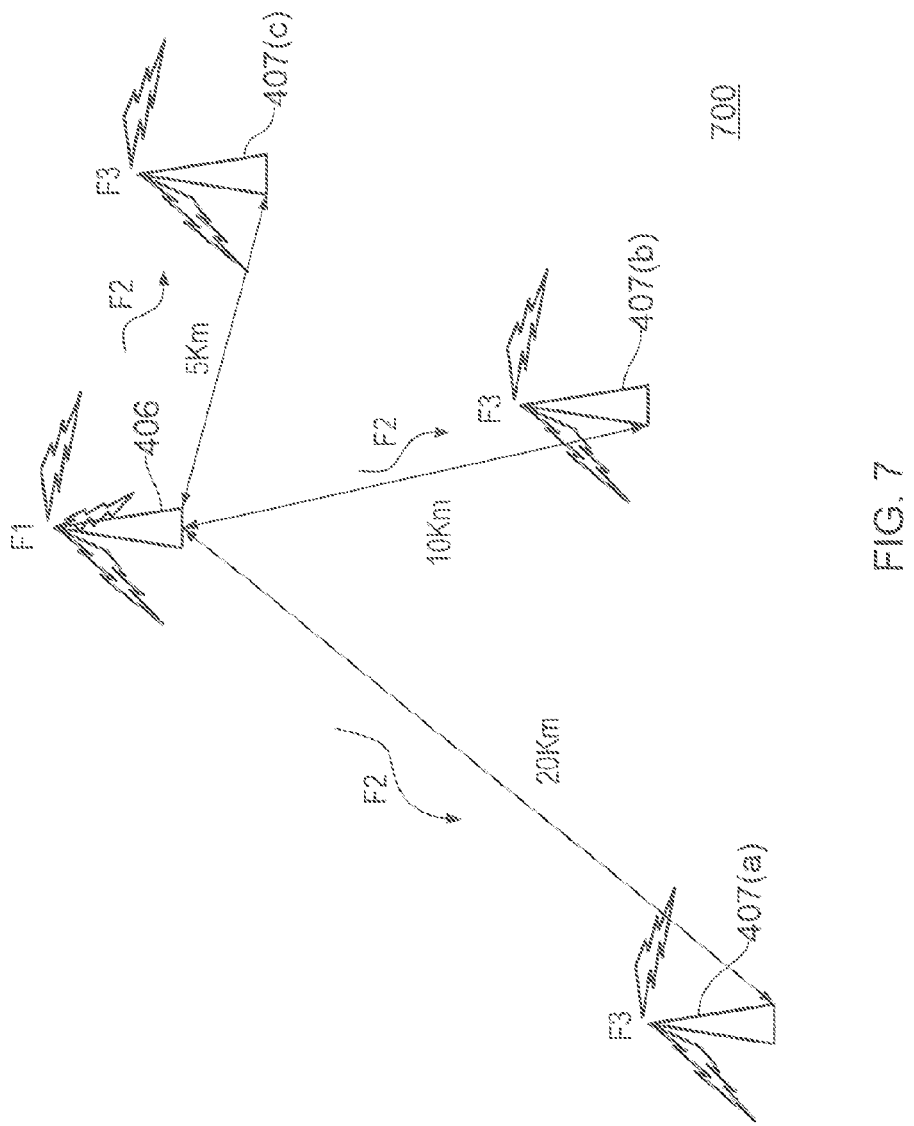
FIG. 7 is a schematic illustration of the difference in separation distance giving rise to different synchronization delay between repeater units in a system in accordance with the embodiment illustrated in FIG. 4.

Managing the synchronization delay between the signals transmitted from plural remote enhancers and the central enhancer for the embodiment described with reference to FIG. 4 may be achieved in a similar manner to that described with reference to FIG. 6 for managing the delays between plural remote enhancers with the embodiment described with reference to FIG. 4. FIG. 7 illustrates a system utilizing the embodiment of FIG. 4 and showing the different distances remote repeater/enhancer stations may be from the central enhancer 406.

Three remote enhancer units, 407(a), 407(b) and 407(c), are located at different distances from the central enhancer unit 406, namely 20 Km, 10 Km and 5 Km. Consequently, the time taken for the RF link path signal at carrier frequencies F2 to propagate from the central enhancer to each of the remote units will be different. In this arrangement there will be a different delay between the signals at carrier frequencies F3 transmitted by each of the remote units 407(a), 407(b) and 407(c). As before, the difference in delay may be calculated based on the simple time, distance, velocity relationship:

$$t=d/c;$$

where t is time taken, d is the distance and c the velocity of light.

For the example illustrated in FIG. 7 the following propagation times may be derived:
Propagation time for remote unit 407(c); $t=5000/3\times 10^8=16.67$ µs;
Propagation time for remote unit 407(b); $t=10000/3\times 10^8=33.33$ µs; and
Propagation time for remote unit 407(a); $t=20000/3\times 10^8=66.67$ µs.

The propagation time is greatest between antenna 436 of central enhancer 406 and antenna 438 of remote unit 407(a), i.e., 66.67 µs. However, the delay due to the separation between the central enhancer antenna 436 and the receive antennas for the other two remote units, 407(b) and 407(c), is less than 66.67 µs. Thus, ISI may occur between the signals transmitted from the other remote units, 407(b) and 407(c), on carrier frequencies F3 and the signal transmitted on carrier frequencies F3 from the most remote unit 407(a) and also between the signals transmitted on carrier frequencies F3 from 407(b) and 407(c) since they experience different delays over their respective RF link paths.

In order to compensate for the difference in signal delays, the repeated signal at remote units 407(b) and 407(c) are delayed by an additional synchronization delay corresponding to the difference between the propagation to respective remote units and the maximum propagation delay, i.e., between the central enhancer unit antenna 436 and receive antenna of remote enhancer unit 407(a). Therefore, an additional synchronization delay of 33.34 µs is introduced into the repeated signal path of remote unit 407(b) and an additional synchronization delay of 50 µs is introduced into the repeated signal path of remote unit 407(c). Naturally, if there were less, i.e., two, or more, i.e., greater than three, remote units the difference in delay would be compensated in each of the units and would be taken into account.

Figure 5:
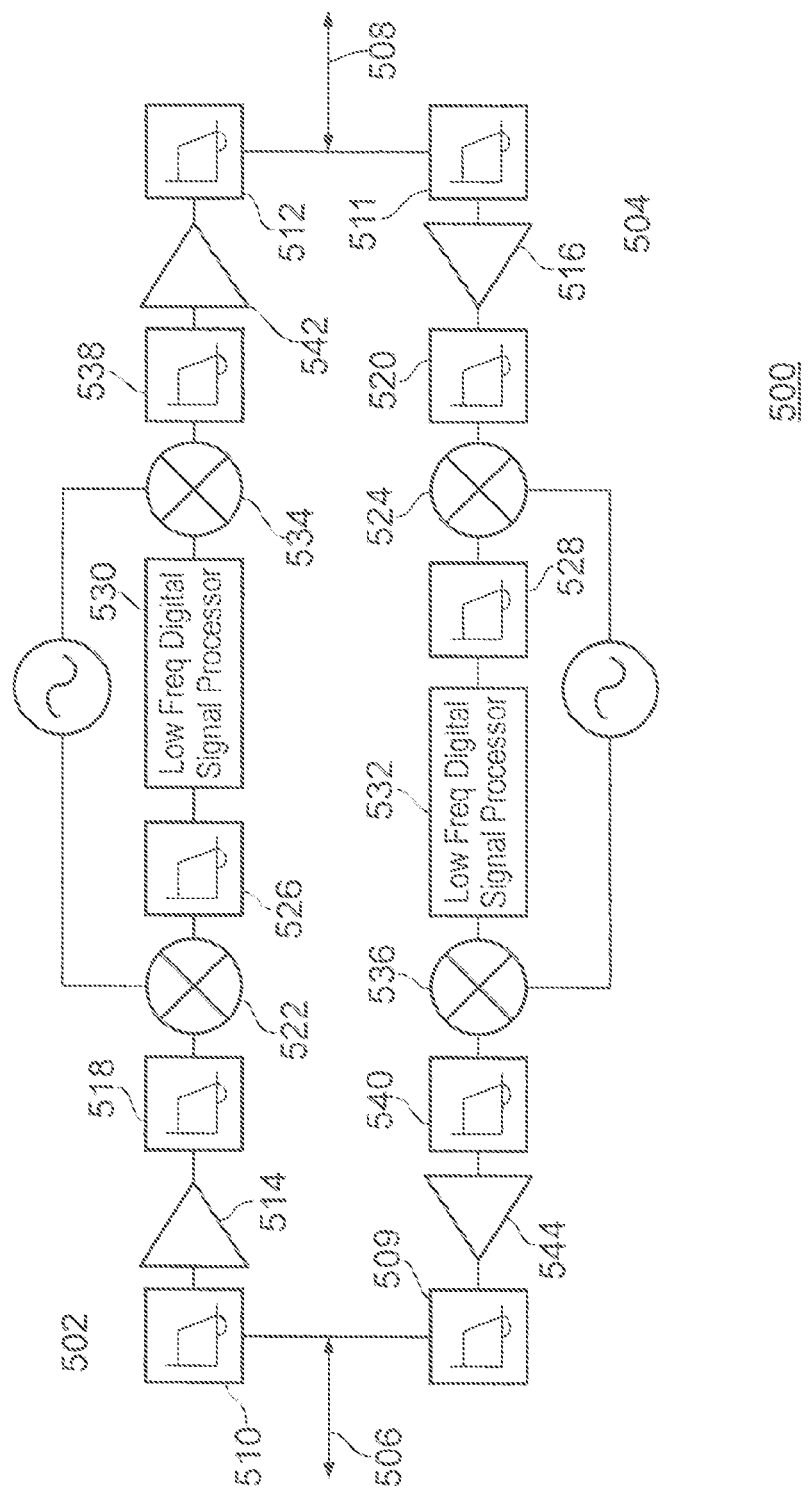
FIG. 5 is a schematic illustration of a filter block for a software definable radio utilizable for one or more embodiments in accordance with the present disclosure.

In one, other or both of the first and second embodiments illustrated in FIGS. 3 and 4 respectively the transmitter and receiver paths may be implemented at least in part in software forming a so-called software defined radio (SDR) such as referred to in the Axell Wireless White Paper discussed above. FIG. 5 is a schematic illustration of a filter transceiver 500 for a SDR. The advantage of an SDR filter is that it is software configurable and delays may be introduced into one or other of the transmit or receive paths under control of software thereby making it suitable for implementation in embodiments of the present invention and moreover remotely configurable.

Additionally, the SDR illustrated in FIG. 5 merely converts carrier frequencies to other carrier frequencies, i.e., F1 frequencies to F2 frequencies, F2 to F1, F3 to F2 and F2 to F3.

Turning now to FIG. 5, a SDR filter module 500 for a repeater/enhancer unit is shown comprising both the uplink path 502 and downlink path 504, respective paths being mirror images of each other. Input/output ports 506 and 508 both receive signals to be repeated and retransmitted in the uplink and downlink directions. The illustrated filter module 500 comprises low noise amplifiers and power amplifiers as well as filter processing and so may be used to replace the separately identified modules 308-314; 318-324 and 326-332; 340-364; of the first embodiment illustrated in FIG. 3 and modules 409-415; 408-414; 418-432; and 440-454 of the second embodiment illustrated in FIG. 4.

At each I/O port 506/508 there are band-pass filters 509, 510, 511, 512 for communicating uplink signals to the uplink path 502 and downlink signals to the downlink path 504. Signals from the uplink path filter 570 and downlink path filter 511 enter respective low noise amplifiers (LNA) 514/516 and subsequently respective band pass filters 518/520. The signals are input to respective down converters 522/524 for down converting to intermediate radio frequency (IF) signals (low-frequency signals suitable for digital signal processing) suitable for signal processing, and the down converted signals are passed through respective IF band pass filters 526/528 to respective signal processing blocks 530/532.

Each signal processing block 530/532 includes an analogue to digital converter (ADC) which converts all input IF signals to digital signals representing the sum of all IF signals at a particular time. The digital signals are input to a digital signal processor (DSP) configured to identify and select the digitized IF signals that are to pass through the filter stage. As the DSP is implemented at least in part in software, sometimes called firmware when in microchip format, it may be real-time user configurable or at least configurable by a user at system implementation or set up. The digital signals resulting from the processing are passed to a digital to analogue converter (DAC) which constructs a radio frequency analogue waveform corresponding to the IF signals which the filter stage is configured to pass.

The reconstructed IF signal output from the DAC is input to respective up converters 534/536 to convert to the appropriate carrier frequency and then to respective power amplifiers 542/544 (e.g. Multi-Channel Power Amplifiers) through respective band pass filter 538/540. The up-converted power amplified signals are then fed to respective isolators 512/509 from which they are output to an antenna.

The IF signal processing bocks are configurable and capable of powerful signal processing operations including performing functions to pass or reject a particular frequency or frequencies or particular band or bands. The signal processing can also be configured to shift the frequency of passed signals so that after up-conversion they are at a shifted carrier frequency compared with the carrier frequency when input to the filter block. Other functions that the signal processing block 530/532 is capable of performing include attenuating individual frequency signals, equalization and automatic level control. The signal processing block 530/532 can also delay signals that are passed through it.

Whilst, the SDR filter block 500 is primarily configured to be suitable for repeater/enhancer units such as utilized in the described embodiments, filter block 500 may be also utilized in the base transceiver stations 304, and 404. Utilization of filter block 500 in central repeater/enhancer 306 of the first embodiment described in relation to FIG. 3 may be particularly effective as the signal delay functionality can be employed to provide the synchronization delay of the signal at carrier frequencies F1 to reduce the delay difference between the main site signal F1 and the repeated signal F1. Also SDR blocks may be used to introduce the delays for multiple remote repeater/enhancers 307/407 and replace components 340-354 and 440-454.

In the second embodiment, filter block 500 may be used to replace each of the transceiver elements 408, 410, 412 and 414 in the second BTS 404, and replace the transceiver elements 418-432 and 440-454 of enhancer units 406 and 407.

Since the filter block 500 is software defined it is suitable for programming any synchronization delay under control of the controller 360 of central enhancer 306, controller 390 of enhancer unit 307 and controller 460 of enhancer unit 407 via a user interface such as a keyboard and display screen or even from a remote central control centre.

In view of the foregoing description it will be evident to a person skilled in the art that various modifications may be made within the scope of the invention. For example, although controllers 380 and 460 are illustrated as being integral with BTS 204 and central enhancer unit 426 respectively they may be physically separate modules. Additionally, they may be remotely controllable from a central control station. Also, two base transceiver stations, are illustrated as separate units in the embodiment described with reference to FIG. 3. However, the BTS modules may be placed in a single housing. Additionally, the central enhancer units may be included in a BTS housing or disposed separately, and even remotely, from the central BTS housings.

Although embodiments disclosed have been described with reference to the downlink direction of communication, the same issues arise in the uplink direction and may be solved using the same approach as described herein. Furthermore, the term base transceiver station and acronym BTS are not intended to restrict embodiments in accordance with the invention to systems, standards or protocols using such terminology but are generally intended to refer to communications equipment serving a geographic area with radio communications coverage providing downlink and/or uplink communications.

The example of delay through the filter sections provided in the description are illustrative only and different delays may be experienced in particular depending upon the filter bandwidth of the channel filters in the repeater/enhancer units.

Insofar as embodiments described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD) subscriber module, tape, cassette, solid-state memory. The computer program may be supplied from a remote source embodied in the communications medium such as an electronic signal, radio frequency carrier wave or optical carrier waves. Such carrier media are also envisaged as aspects of the present invention.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalization thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

What is claimed is:

1. A communications apparatus, arranged to:
   configure a signal for transmission via an antenna on a first carrier frequency;
   configure said signal for transmission on a second carrier frequency to a remote repeater station for retransmission on said first carrier frequency to form a repeated signal; and
   delay said signal for transmission on said first carrier frequency, said delay corresponding to the sum of the time taken for said signal on said second carrier frequency to reach said remote repeater station and the time taken for said signal to transition said first remote repeater station to a transmit antenna thereof.

2. The communications apparatus according to claim 1 comprising a local repeater station operative to transmit on said second carrier frequency and wherein said communications apparatus is further arranged to couple said signal to said local repeater station for transmission on said second carrier frequency.

3. The communications apparatus according to claim 2, further arranged to couple said signal to said local repeater at said first carrier frequency.

4. The communications apparatus according to claim 2, wherein said local repeater station comprises two configuration paths, a first configuration path for said signal for transmission on said first carrier frequency and a second configuration path for configuring signal on to said second carrier frequency.

5. The communications apparatus according to claim 4, wherein said first configuration path is configurable to introduce said delay into said signal for transmission on said first carrier frequency.

6. The communications apparatus according to claim 2, comprising:
   a first module arranged to configure said signal for transmission on a first carrier frequency; and
   a second module comprising said local repeater station.

7. The communications apparatus according to claim 6, wherein said first module comprises a base transceiver station.

8. The communications apparatus according to claim 1, comprising a user interface for configuring said delay in said signal for transmission.

9. The communications apparatus according to claim 8, wherein said user interface is configured to provide remote access for configuring said delay.

10. A repeater station comprising a communications apparatus arranged to:
    receive a signal on a first carrier frequency from said communications apparatus;
    configure said signal for re-transmission on said first carrier frequency;
    configure said signal for transmission on a second carrier frequency to a remote repeater station for retransmission on said first carrier frequency to form a repeated signal;
    delay said signal for re-transmission on said first carrier frequency, said delay corresponding to the sum of the time taken for a signal on said second carrier frequency to reach said remote repeater station and the time taken for said signal to transition said remote repeater station to a transmit antenna thereof.

11. The repeater station according to claim 10, comprising first and second configuration paths, said first configuration path for configuring said signal for transmission on said first carrier frequency and said second configuration path for configuring signals on to said second carrier frequency.

12. The repeater station according to claim 11, wherein said first configuration path is configurable to delay said signal for transmission on said first carrier frequency.

13. The repeater station according to claim 10, comprising a user interface operative to configure said repeater station to introduce said delay through said first configuration path.

14. The repeater station according to claim 13, wherein said user interface is configured to provide remote access to said repeater station for configuring said delay.

15. A repeater station operative as a remote repeater station, comprising:
    a communications receiver configured to receive a signal transmitted on a second carrier frequency; and
    a communications transmitter configured to transmit on a first carrier frequency said signal received by said communications receiver on said second carrier frequency to form a repeated signal;
    said remote repeater station configurable to introduce a delay in said signal for transmission on said first carrier frequency, said delay corresponding to the sum of the time taken for a signal on said second carrier frequency to reach said remote repeater station and the time taken for said signal to transition said remote repeater station to said communications antenna thereof.

16. The remote repeater station according to claim 15, further comprising a user interface operative to configure said delay in said signal to be transmitted on said first or third carrier frequency.

17. The remote repeater station according to claim 16, wherein said user interface is configured to provide remote access to said remote repeater station for configuring said delay.

18. A communications system, comprising:
    a communications apparatus arranged to:
        configure a signal for transmission on a first carrier frequency;
        configure said signal for transmission on a second carrier frequency to a remote repeater station for retransmission on said first carrier frequency to form a repeated signal, and
        delay said signal for transmission on a first carrier frequency;
    a local repeater station configured to receive said signal on said first carrier frequency from said communications apparatus and retransmit said signal via an antenna on said second carrier frequency; and
    a first remote repeater station for receiving said signal on said second carrier frequency and re-transmitting said signal on said first carrier frequency;
    wherein said local repeater station is configured to invoke a synchronization delay in said signal for transmission on said first carrier frequency corresponding to the sum of the time taken for a signal on said second carrier frequency to reach said first remote repeater station and the time taken for said signal to transition said first remote repeater station to a transmit antenna thereof.

19. The communications system according to claim 18, further comprising a second remote repeater station, wherein said second remote repeater station is placed at a shorter distance from said local repeater station than said first remote repeater station, said second remote repeater station configured to invoke a synchronization delay in said signal for transmission on said first carrier frequency corresponding to the difference between the time taken for a signal on said second carrier frequency to reach said first remote repeater station from said local repeater station and the time taken for a signal on said second carrier frequency to reach said second remote repeater station from said local repeater station.

20. A communications method comprising:
configuring a signal for transmission via an antenna on a first carrier frequency;
configuring said signal for transmission on a second carrier frequency to a remote repeater station for retransmission on said first carrier frequency to form a repeated signal; and
delaying said signal for transmission on said first carrier frequency, said delay corresponding to the sum of the time taken for a signal on said second carrier frequency to reach said remote repeater station and the time taken for said signal to transition said remote repeater station to a transmit antenna thereof.

21. The method according to claim 20 comprising transmitting on said second carrier frequency from a local repeater station and coupling said signal to said local repeater station for transmission on said second carrier frequency.

22. The method according to claim 21, further comprising coupling said signal to said local repeater at said first carrier frequency.

23. The method according to claim 21, further comprising providing two configuration paths, a first configuration path for said signal for transmission on said first carrier frequency and a second configuration path for configuring signal on to said second carrier frequency.

24. The method according to claim 23, further comprising introducing said delay into said signal for transmission on said first carrier frequency.

25. The method according to claim 20, further comprising providing a user interface for configuring said delay in said signal for transmission.

26. The method according to claim 25, further comprising configuring said user interface to provide remote access for configuring said delay.

27. A method of operating a repeater station as a local repeater station comprising:
receiving a signal on a first carrier frequency from a communications apparatus;
configuring said signal for re-transmission on said first carrier frequency;
configuring said signal for transmission on a second carrier frequency to a remote repeater station for retransmission on said first carrier frequency to form a repeated signal;
delaying said signal for transmission on said first carrier frequency, said delay corresponding to the sum of the time taken for said signal on said second carrier frequency to reach said remote repeater station and the time taken for said signal to transition said remote repeater station to a transmit antenna thereof.

28. The method according to claim 27, further comprising configuring said signal for transmission on said first carrier frequency on a first configuration path and configuring signals on to said second carrier frequency on a second configuration path.

29. The method according to claim 28, wherein said first configuration path is configurable to delay said signal for transmission on said first carrier frequency.

30. The method according to claim 29, configuring a user interface for introducing said delay through said first configuration path.

31. The method according to claim 30, further comprising providing remote access to said repeater station for configuring said delay.

32. A method for operating a remote repeater station, comprising:
receiving a signal transmitted on a second carrier frequency; and
transmitting on a first carrier frequency said signal received by a communications receiver thereof on said second carrier frequency to form a repeated signal; and
introducing a delay in said signal for transmission on said first carrier frequency, said delay corresponding to the sum of the time taken for a signal on said second carrier frequency to reach said remote repeater station and the time taken for said signal to transition said remote repeater station to a transmit antenna thereof.

33. The method according to claim 32, further comprising configuring said delay in said signal to be transmitted on said first or third carrier frequency via a user interface.

34. The method according to claim 33, further comprising providing remote access to said remote repeater station for configuring said delay.

35. A non-transitory computer readable storage medium having executable computer program instructions embodied therein, said computer program comprising instructions that when executed cause a processor to:
receive a signal on a first carrier frequency from a communications apparatus;
configure said signal for re-transmission on said first carrier frequency;
configure said signal for transmission on a second carrier frequency to a remote repeater station for retransmission on said first carrier frequency to form a repeated signal; and
delay said signal for transmission on said first carrier frequency, said delay corresponding to the sum of the time taken for a signal on said second carrier frequency to reach said remote repeater station and the time taken for said signal to transition said remote repeater station to a transmit antenna thereof.

36. A non-transitory computer readable storage medium having executable computer program instructions embodied therein, said computer program comprising instructions that when executed cause a processor to:
receive a signal transmitted on a second carrier frequency; and
transmit on a first carrier frequency said signal received on said second carrier frequency to form a repeated signal; and
introduce a delay in said signal for transmission on said first carrier frequency, said delay corresponding to the sum of the time taken for a signal on said second carrier frequency to reach a remote repeater station comprising said processor and the time taken for said signal to transition said repeater station to a transmit antenna thereof.

* * * * *